(12) United States Patent
Desta et al.

(10) Patent No.: US 6,724,110 B2
(45) Date of Patent: Apr. 20, 2004

(54) RELUCTANCE GENERATOR FOR AN EDDY CURRENT BRAKING SYSTEM

(75) Inventors: Girma G. Desta, Southfield, MI (US); Kevin J. Pavlov, Livonia, MI (US); Zhesheng Li, Detroit, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 165 days.

(21) Appl. No.: 10/036,607

(22) Filed: Dec. 31, 2001

(65) Prior Publication Data

US 2003/0122436 A1 Jul. 3, 2003

(51) Int. Cl.[7] .............................................. H02K 7/112
(52) U.S. Cl. .......................................... 310/77; 310/168
(58) Field of Search ............................ 310/77, 112, 113, 310/114, 115, 93, 180, 179

(56) References Cited

U.S. PATENT DOCUMENTS

| | | | |
|---|---|---|---|
| 3,912,958 A | | 10/1975 | Steen |
| 5,936,325 A | * | 8/1999 | Permuy .................. 310/162 |
| 6,002,233 A | | 12/1999 | McCann |
| 6,169,349 B1 | * | 1/2001 | Davenport .............. 310/114 |
| 6,310,452 B1 | * | 10/2001 | Deck et al. ............. 318/273 |
| 6,373,162 B1 | * | 4/2002 | Liang et al. ......... 310/156.53 |
| 6,429,556 B1 | * | 8/2002 | Nakamura et al. ........ 310/71 |
| 6,472,790 B2 | * | 10/2002 | Rose, Sr. ............... 310/184 |
| 6,578,649 B1 | * | 6/2003 | Shimasaki et al. ....... 180/65.2 |

FOREIGN PATENT DOCUMENTS

| | | |
|---|---|---|
| EP | 0 261 953 A2 | 3/1988 |
| GB | 990699 | 2/1963 |
| GB | 1 286 035 | 1/1970 |

* cited by examiner

*Primary Examiner*—Nicholas Ponomarenko
*Assistant Examiner*—Leda Pham
(74) *Attorney, Agent, or Firm*—Brinks Hofer Gilson & Lione

(57) ABSTRACT

The invention provides a reluctance generator for an eddy current braking system in a vehicle. The reluctance generator has a field winding and a compensation winding, which induce magnetomotive forces. The magnetomotive force induced by the compensation winding balances the magnetomotive force generated by a rotor in the reluctance generator. The field winding has less inductance.

29 Claims, 4 Drawing Sheets

RELUCTANCE GENERATOR FOR AN EDDY CURRENT BRAKING SYSTEM

FIELD OF THE INVENTION

This invention relates generally to generators used in eddy current retarding systems. More specifically, this invention relates to reluctance generators used in eddy current braking systems for vehicles.

BACKGROUND OF THE INVENTION

Vehicles use brakes and similar retarding systems to decelerate. Vehicles include automobiles, trucks, buses, and the like. Friction braking or deceleration systems typically include drum or disc systems. Drum systems use traditional wear pads. Disc systems have a friction rotor/stator arrangement. Both systems have components that require periodic maintenance. Normal wear and tear of the friction components in these systems often results in periodic and expensive repairs. Failure to check and repair or replace worn components can result in damage to the braking system and to the vehicle. Additionally, these systems convert kinetic energy from the wheels and axles into heat, which increases the wear of the brake pads or discs.

Many vehicles use electromagnetic retarders for braking and deceleration systems. Electromagnetic retarders often use an electric generator to retard the rotation of an axle or a drive shaft, which also is the rotor for the generator. During non-braking periods, the generator may generate electricity from the energy generated by the spinning axle. The electricity usually to recharges a battery such as in a regenerative braking system. The energy also may be dissipated as heat especially when there is a large amount of kinetic energy or torque to convert to electrical energy or heat. To decelerate or brake, the electric rotor or generator applies reluctance from a stator to the rotor. The application of the reluctance on the stator creates eddy currents in the rotor. The eddy currents reduce or slow the rotation of the rotor, which decelerates the vehicle.

SUMMARY

The invention provides a reluctance generator for an eddy current braking system in a vehicle where a magnetomotive force induced by a compensation winding balances the magnetomotive force generated by a rotor.

In one aspect, a reluctance generator for an eddy current braking system in a vehicle has a stator assembly and a rotor. The stator assembly defines a core space and has a field winding and a compensation winding. The field winding is operable to induce a field magnetomotive force (MMF) in response to a first excitation. The compensation winding is operable to induce a compensation magnetomotive force (MMF) in response to a second excitation. The rotor is disposed in the core space and is operable to generate an armature magnetomotive force (MMF). The compensation MMF balances the armature MMF.

In another aspect, a reluctance generator for an eddy current braking system has lamination sections, a field winding, a compensation winding, an armature winding, and a rotor. The lamination sections are disposed along an interior surface of a stator assembly. The lamination sections define a core space and a winding volume. The field winding is disposed along an outer portion of the winding volume. The field winding is operable to induce a field magnetomotive force (MMF) in response to a first excitation. The compensation winding is disposed along an inner portion of the winding volume. The compensation winding is operable to induce a compensation magnetomotive force (MMF) in response to a second excitation. The armature winding is disposed in the lamination sections. The rotor is disposed in the core space. The rotor has a first section and a second section disposed on opposite sides of a center ring mounted on a shaft. The center ring is aligned with the excitation and compensation windings. The rotor is operable to generate an armature magnetomotive force (MMF). The compensation MMF balances the armature MMF.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Figure 1:
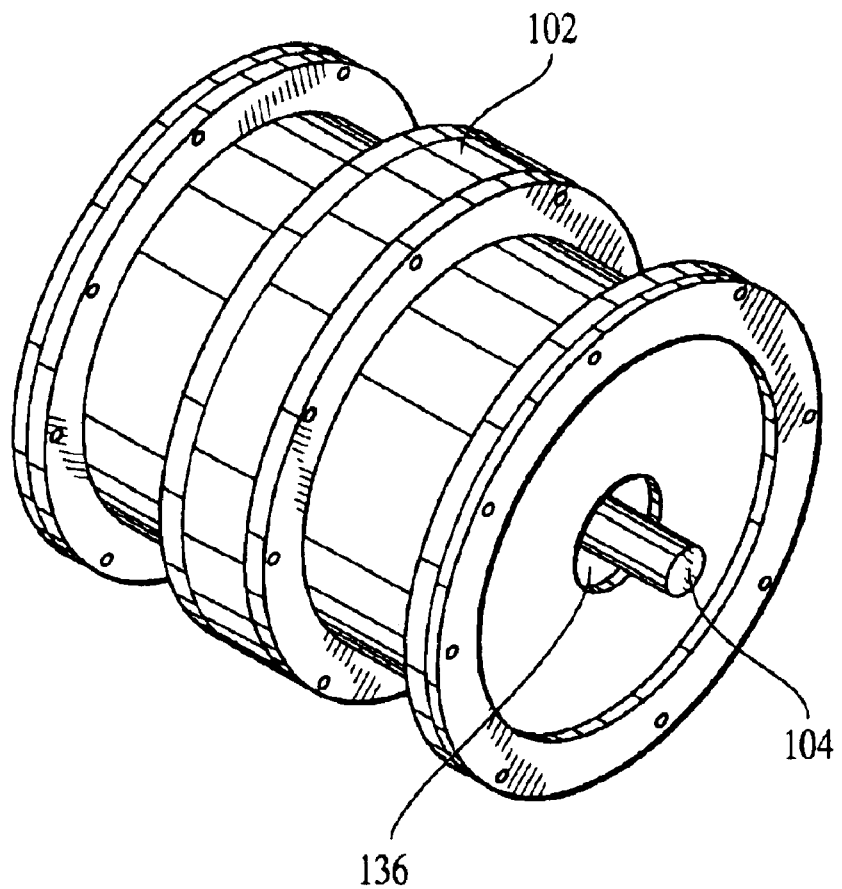
FIG. 1 represents a perspective view of a reluctance generator for an eddy current braking system according to an embodiment.
Figure 2:
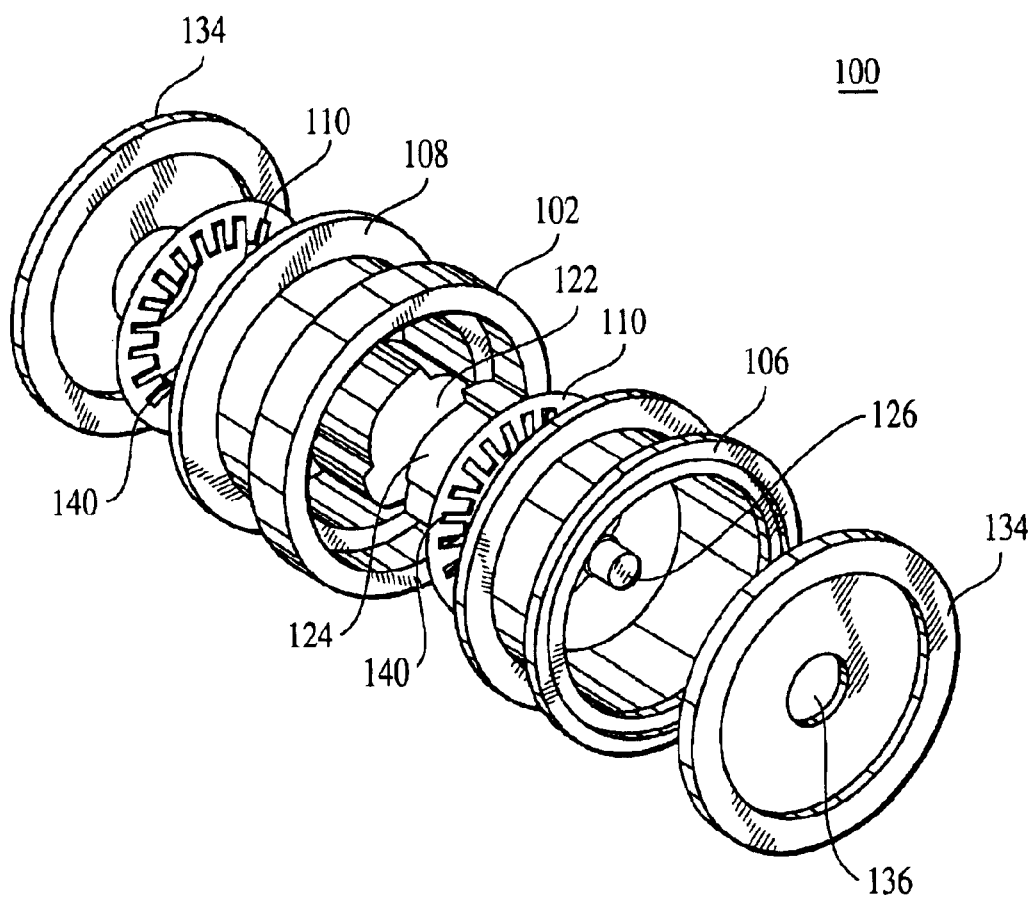
FIG. 2 represents an expanded view of the reluctance generator shown in FIG. 1.
Figure 3:
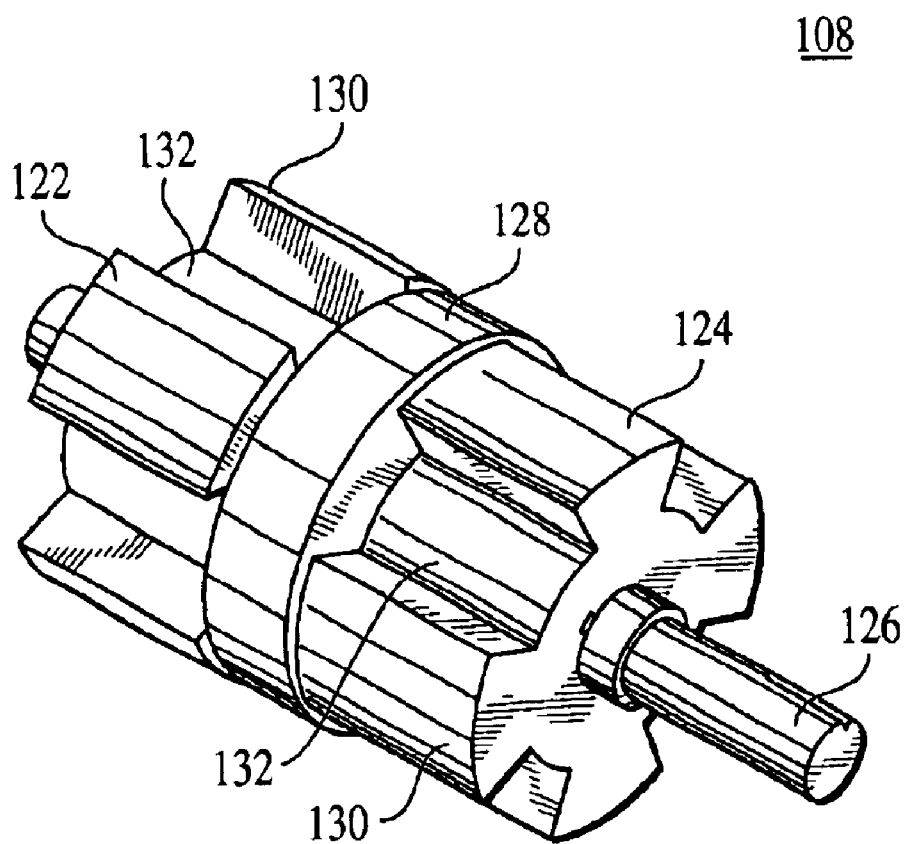
FIG. 3 represents a perspective view of a rotor for the reluctance generator shown in FIG. 1.
Figure 4:
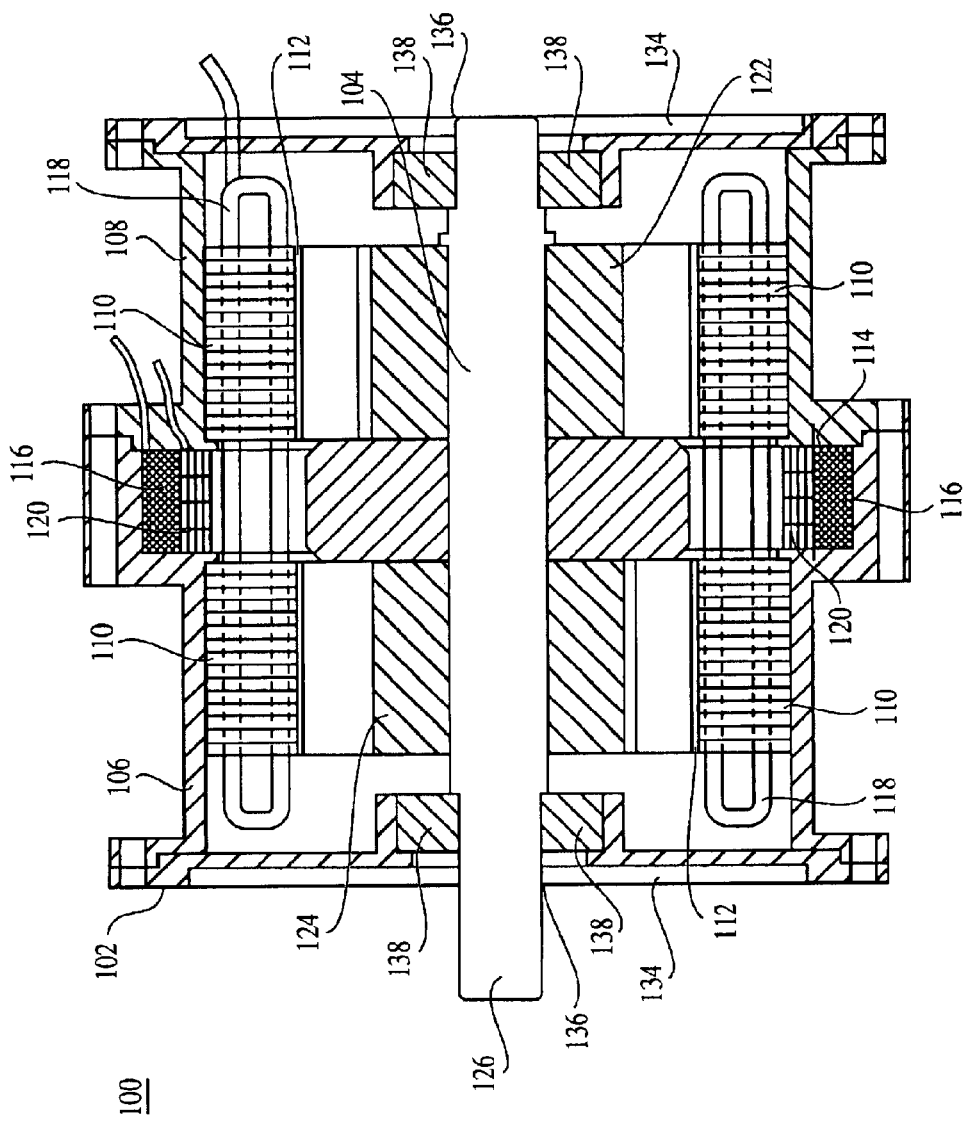
FIG. 4 represents a cross section view of the reluctance generator shown in FIG. 1.

FIGS. 1–4 represent various views of a reluctance generator 100 for an eddy current braking system according to an embodiment. FIG. 1 represents a perspective view of the reluctance generator 100. FIG. 2 represents an expanded view of the reluctance generator 100. FIG. 3 represents a perspective view of a rotor for the reluctance generator 100. FIG. 4 represents a cross section schematic view of the reluctance generator 100. The reluctance generator 100 may have a nominal direct current (DC) output voltage of about 42V and a nominal DC current of about 1066 A. The reluctance generator 100 may have a nominal alternating current (AC) phase voltage of about 21.8V and a nominal AC current of about 852.8 A. The reluctance generator 100 also may have eight poles and may operate at about 200 Hz with a full load duty cycle of about 35 percent using pulse width modulation (PWM). The reluctance generator 100 may have other configurations and arrangements including those with fewer and additional components. The reluctance generator also may have other operating parameters.

The reluctance generator 100 has a stator assembly 102 and a rotor 104. The stator assembly 102 includes a first stator portion 106 and a second stator portion 108, which form a cylindrical configuration when assembled. The stator assembly 102 has an armature formed by lamination sections 110 disposed axially along an interior surface. The lamination sections 110 each comprise multiple laminations. The lamination sections 110 define a core space 112 radially along the axis of the stator assembly 102. The stator assembly 102 and lamination sections 110 define a winding volume 114 axially along the interior of the stator assembly 102.

A direct current (DC) excitation or field winding 116 is disposed within the stator assembly 102 along an outer portion of the winding volume 114. The field winding 116 may have another configuration or arrangement. The field winding 116 is stationary and is located between the lamination sections 110 at a center portion of the stator assembly 102. In one aspect, the field winding 116 has round wires. Other wire configurations may be used.

A waveform armature winding 118 runs along the length of the reluctance generator 100 within the lamination sections 110 and the center portion of the stator assembly 102. In one aspect the armature winding 118 is made of a square wire. Other wire configurations may be used. The reluctance generator 100 may have one or more phases. Each phase in the reluctance generator 100 comprises one parallel path of the armature winding 118. In one aspect, the lamination sections 110 define winding slots 140 running axially along the interior of the reluctance generator 100. The armature winding 118 is disposed in the winding slots 140.

A compensation winding 120 is disposed within the stator assembly 102 along an inner portion of the winding volume 114. The compensation winding 120 is disposed between the field winding 116 and the armature winding 118. The compensation winding 120 may have another configuration or arrangement. The compensation winding 120 may be connected with an output direct current circuit for the reluctance generator 100. In one aspect, the compensation winding 120 has rectangular wires. Other wire configurations may be used.

The rotor 104 has a first section 122 and a second section 124 mounted on a shaft 126 on opposite sides of a center ring 128. In one aspect, the sections 122 and 124 each have four pole sections 130 defining pole slots 132. The pole sections in the first section 122 are offset or have been shifted by about one slot pitch in relation to the pole sections in the second section 124 thus producing a magnetic field of eight poles. The rotor 104 may have fewer or additional pole sections and may have other configurations including those with fewer or additional magnetic poles. One section 122 and 124 produce the north poles in the magnetic field of the rotor 104. The other section 122 and 124 produces the south poles in the magnetic field. In one aspect, the pole sections in the first section 122 are offset from the pole sections in the second section 124 by about 45 degrees. In another aspect, the center ring 128 has a smaller diameter than of the pole sections 130. In a further aspect, the rotor 104 is made of steel or another iron-based material. When the reluctance generator 100 is incorporated into an eddy current braking system for a vehicle, the shaft 126 may comprise an axle for a wheel or may comprise the drive shaft for a power train.

The reluctance generator 100 also has end plates 134 connected to the ends of the stator assembly 102 and enclosing the core space 112. The end plates 134 each define an aperture 136 extending into the core space 112 along the axis of the stator assembly 102. In one aspect, one of the apertures is open while the other aperture is closed. In another aspect, both apertures are open. The end plates 134 have bushings 138 mounted adjacent and further defining the apertures 136.

When assembled, the rotor 104 is disposed within the core space 112. The shaft 126 extends into the apertures 136 formed by the bushings 138 and the end plates 134. The bushings 138 hold the rotor 104 and permit the rotor 104 to rotate freely within the core space 112. The center ring 128 is aligned with the field winding 116 and the compensation winding 148 in the winding volume 114. "Aligned" includes the center ring 128 being partially or completely adjacent to the excitation and/or compensation windings. "Aligned" also includes the center ring 128 being partially or completely adjacent to the winding volume 114.

During operation, the rotor 104 spins within the core space 112. The rotation of the rotor 104 may be due to the rotation of the axle and wheels or the rotation of the drive shaft in the vehicle, where the axle or drive shaft comprises the shaft 126 in the reluctance generator 100. The rotation of the rotor 104 generates an armature magnetomotive force (MMF). In one aspect, the armature MMF is used to generate electricity, which may be used to power the electrical system in a vehicle, charge a battery or other energy storage device, and the like. In another aspect, the armature MMF generates energy that is dissipated as heat.

A first excitation is applied across the field winding 116. A second excitation is applied across the compensation winding 120. The first and second excitations may be currents or voltages. A battery or other power supply provides the first and second excitations, which may comprise pulse width modulation (PWM) signals.

The excitations induce magnetic fields, which create eddy currents that retard or reduce the rotation of the rotor 104. The excitations may be applied at different frequencies and different durations to reduce the rotation of the motor 104. The excitations generate magnetic fields between the stator assembly 102 and the rotor 104, which create eddy currents in the shaft 126. The eddy currents oppose the rotation of the shaft 126, thus creating a braking torque. When the shaft 126 comprises the axle or a drive shaft of a vehicle, the application of the excitations reduces the speed of the vehicle.

When the excitations are applied, the excitation and compensation windings 116 and 120 induce axial magnetic fields and form a single polarity magnetic flux in each side of the laminations. The excitation and compensation windings 116 and 120 induce an excitation magnetomotive force (MMF) that is opposite in direction to an armature magnetomotive force (MMF) of the armature reaction. The excitation MMF comprises a field MMF and a compensation MMF. The field MMF is responsive or proportional to the first excitation applied to the field winding 116. The compensation MMF is responsive or proportional to the second excitation applied to the compensation winding 120.

The compensation MMF balances the armature MMF thus reducing the inductance in the field winding 116. The lower inductance improves the dynamic response speed of the reluctance generator 100. "Balances" includes partially or fully offsetting one MMF with another MMF to result in little or no net MMF. "Balances" also includes partially or fully offsetting one MMF with another MMF to result in a predetermined or set MMF. In one aspect, the application of the second excitation on the compensation winding 120 induces about half of the MMF required to create the breaking torque. In another aspect, the application of the second excitation on the compensation winding 120 induces more than half of the MMF required to create the breaking torque.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A reluctance generator for an eddy current braking system in a vehicle, comprising:
   a stator assembly defining a core apace, the stator assembly comprising a field winding and a compensation winding, the field winding operable to induce a field magnetomotive force (MMF) in respons, to a first excitation, the compensation winding operable to induce a compentation magnetomotive force (MMF) in response to a second excitation;
   a rotor disposed in the core space, the rotor operable to generate an armature magnetomotive force (MMF);
   lamination sections disposed along an interior surface of the stator assembly; and
   an armature winding disposed about portions of the lamination sections.

2. The reluctance generator of claim 1,
   where the stator assembly defines a winding volume,
   where the field winding is disposed along an outer portion of the winding volume, and
   where the compensation winding is disposed along an inner portion of the winding volume.

3. The reluctance generator of claim 1, where the excitation winding comprises a round wire: and where the compensation winding comprises a rectangular wire.

4. The reluctance generator of claim 1, where at least one of the first and second excitations comprises a voltage.

5. The reluctance generator of claim 1, where at least one of the first and second excitations comprises a pulse width modulation excitation.

6. The reluctance generator of claim 5, where the pulse width modulation has a duty cycle of about 35 percent.

7. The reluctance generator of claim 1, where the compensation MMF balances the armature MMF.

8. The reluctance generator of claim 7, where the lamination sections define at least one winding slot; and where the armature winding is disposed in the at least one winding slot.

9. The reluctance generator of claim 7, where the armature winding comprises a square wire.

10. The reluctance generator of claim 1, where the rotor comprises a first section and a second section disposed on opposite sides of a center ring mounted on a shaft.

11. The reluctance generator of claim 10, where the center ring is aligned with at least one of the field and compensation windings.

12. The reluctance generator of claim 10,
    where the first section defines multiple first pole sections forming first pole slots; and
    where the second section defines multiple second pole sections forming second pole slots.

13. The reluctance generator of claim 12, where the first pole sections are shifted in relation to the second pole sections.

14. The reluctance generator of claim 12, where the first and second pole sections are shifted by about one pole slot.

15. The reluctance generator of claim 12, where the first and second pole sections are offset by about 45 degrees.

16. The reluctance generator of claim 11,
    where the first section comprises four first pole sections; and
    where the second section comprises four second pole sections.

17. The reluctance generator of claim 10, where the center ring has a smaller diameter than one of the first and second sections.

18. The reluctance generator of claim 1, where the rotor comprises one of an axle and a drive shaft for the vehicle.

19. The reluctance generator of claim 1 having an output voltage of 42V.

20. A reluctance generator for en eddy current braking system, comprising:
    lamination sections disposed along an interior surface of a stator assembly, the lamination sections defining a core space and a winding volume;
    a field winding disposed along an outer portion of the winding volume, the field winding operable to induce a field magnetomotive force (MMF) in response to a first excitation;
    a compensation winding disposed along an inner portion of the winding volume, the compensation winding operable to induce a compensation magnetomotive force (MMF) in response to a second excitation;
    an armature winding disposed in the lamination sections; and
    a rotor disposed in the core space, the rotor comprising a first section and a second section disposed on opposite sides of a center ring mounted on a shaft, the center ring aligned with the excitation and compensation windings, the rotor operable to generate an armature magnetomotive force (MMF),
    where the compensation MMF balances the armature MMF.

21. The reluctance generator of claim 20, where the lamination sections define at least one winding slot; and where the armature winding is disposed in the at least one winding slot.

22. The reluctance generator of claim 20,
    where the excitation winding comprises a round wire;
    where the compensation winding comprises a rectangular wire; and
    where the armature winding comprises a square wire.

23. The reluctance generator of claim 20,
    where the first section defines multiple first pole sections forming first pole slots; and
    where the second section defines multiple second pole sections forming second pole slots.

24. The reluctance generator of claim 23, where the first pole sections are shifted in relation to the second pole sections.

25. The reluctance generator of claim 24, where the first pole sections and the second pole sections are shifted by about 45 degrees.

26. The reluctance generator of claim 20, where the center ring has a smaller diameter than the first and second sections.

27. The reluctance generator of claim 20, where the shaft comprises one of an axle and a drive shaft in the vehicle.

28. The reluctance generator of claim 20, where at least one of the first and second excitations comprises a voltage.

29. The reluctance generator of claim 20, where at least one of the first and second excitations comprise a pulse width modulation excitation.

* * * * *

UNITED STATES PATENT AND TRADEMARK OFFICE
CERTIFICATE OF CORRECTION

PATENT NO. : 6,724,110 B2
DATED : April 20, 2004
INVENTOR(S) : Girma G. Desta et al.

It is certified that error appears in the above-identified patent and that said Letters Patent is hereby corrected as shown below:

Column 5,
Line 9, delete "apace," and substitute -- space, -- in its place;
Line 12, delete "respons," and substitute -- response -- in its place;
Line 14, delete "compentation" and substitute -- compensation -- in its place;
Line 30, immediately after "round wire" delete ":" (colon) and substitute -- ; -- (semicolon) in its place.

Signed and Sealed this

Twenty-first Day of December, 2004

JON W. DUDAS
*Director of the United States Patent and Trademark Office*